United States Patent
Keserich et al.

(10) Patent No.: US 10,839,262 B2
(45) Date of Patent: Nov. 17, 2020

(54) MACHINE LEARNING A FEATURE DETECTOR USING SYNTHETIC TRAINING DATA

(71) Applicant: HERE Global B.V., Eindhoven (NL)

(72) Inventors: Brad Keserich, Eindhoven (NL); Stephen O'Hara, Eindhoven (NL); Nicholas Dronen, Eindhoven (NL)

(73) Assignee: HERE Global B.V., Eindhoven (NL)

(*) Notice: Subject to any disclaimer, the term of this patent is extended or adjusted under 35 U.S.C. 154(b) by 189 days.

(21) Appl. No.: 15/961,312

(22) Filed: Apr. 24, 2018

(65) Prior Publication Data
US 2019/0325264 A1    Oct. 24, 2019

(51) Int. Cl.
| | |
|---|---|
| G06K 9/62 | (2006.01) |
| G06K 9/66 | (2006.01) |
| G06T 17/05 | (2011.01) |
| G06N 3/08 | (2006.01) |
| G01C 21/36 | (2006.01) |

(Continued)

(52) U.S. Cl.
CPC ....... G06K 9/6256 (2013.01); G01C 21/3602 (2013.01); G06K 9/66 (2013.01); G06N 3/08 (2013.01); G06N 20/00 (2019.01); G06T 17/05 (2013.01); G06T 17/20 (2013.01)

(58) Field of Classification Search
None
See application file for complete search history.

(56) References Cited

U.S. PATENT DOCUMENTS

| | | |
|---|---|---|
| 9,536,315 B2 | 1/2017 | Bulan et al. |
| 10,410,328 B1 * | 9/2019 | Liu ........... G06K 9/4676 |

(Continued)

FOREIGN PATENT DOCUMENTS

WO    WO 2017/021322 A1    2/2017

OTHER PUBLICATIONS

Bousmalis, Konstaninos, et al., "Unsupervised Pixel-Level Domain Adaptation with Generative Adversarial Networks", Google Brain Residency Program, Aug. 23, 2017, 15 pages, retrieved from <https://arxiv.org/pdf/1612.05424.pdf> on Sep. 9, 2018.

(Continued)

*Primary Examiner* — Randolph I Chu
(74) *Attorney, Agent, or Firm* — Alston & Bird LLP

(57) ABSTRACT

Synthetic training information/data of a second probe style is generated based on first probe information/data of a first probe style using a style transfer model. First probe information/data is defined. An instance of first probe information/data comprises labels and first probe style sensor information/data. A style transfer model generates training information/data based on at least a portion of the first probe information/data. An instance of training information/data corresponds to an instance of first probe information/data and comprises second probe style sensor information/data. The first and second probe styles are different. A second probe style model is trained using machine learning and the training information/data. The second probe style model is used to analyze second probe style second probe information/data to extract map information/data from the second probe information/data. Each instance of second probe data is captured by one or more second probe sensors of a second probe apparatus.

20 Claims, 5 Drawing Sheets

(51) Int. Cl.
  *G06N 20/00* (2019.01)
  *G06T 17/20* (2006.01)

(56) References Cited

U.S. PATENT DOCUMENTS

| | | | | |
|---|---|---|---|---|
| 10,437,252 | B1* | 10/2019 | Liu | G01C 21/3691 |
| 2017/0132334 | A1* | 5/2017 | Levinson | G06F 17/5009 |
| 2017/0300783 | A1 | 10/2017 | Kumar et al. | |
| 2017/0351935 | A1 | 12/2017 | Liu et al. | |
| 2018/0365772 | A1* | 12/2018 | Thompson | G06Q 50/30 |
| 2019/0147331 | A1* | 5/2019 | Arditi | G01C 21/32 |
| | | | | 706/20 |
| 2019/0196503 | A1* | 6/2019 | Abari | G06Q 10/00 |
| 2019/0197369 | A1* | 6/2019 | Law | G06K 9/66 |
| 2019/0197497 | A1* | 6/2019 | Abari | G06Q 10/20 |
| 2019/0212749 | A1* | 7/2019 | Chen | B60W 30/00 |
| 2019/0258878 | A1* | 8/2019 | Koivisto | G06N 3/0445 |
| 2019/0259182 | A1* | 8/2019 | Sarukkai | G06K 9/627 |
| 2019/0286938 | A1* | 9/2019 | Backhus | G06T 17/20 |
| 2019/0318206 | A1* | 10/2019 | Smith | G01S 17/58 |

OTHER PUBLICATIONS

Kogan, Gene, "Experiments with Style Transfer", 2015, retrieved from <http://genekogan.com/works/style-transfer/> on Sep. 9, 2018.

Pan, Xinlei, et al., "Virtual to Real Reinforcement Learning for Autonomous Driving", Sep. 26, 2017, 13 pages, University of California, USA; Shanghai Jiao Tong University, Tsinghua University, China, retrieved from <https://arxiv.org/pdf/1704.03952.pdf> on Sep. 9, 2018.

Peng, Xingchao, et al., "Synthetic to Real Adaptation with Generative Correlation Alignment Networks", Boston University, Mar. 18, 2017, 10 pages, retrieved from <https://arxiv.org/pdf/1701.05524.pdf> on Sep. 9, 2018.

Ros, German, et al., "The SYNTHIA Dataset: A Large Collection of Synthetic Images for Semantic Segmentation of Urban Scenes", Proceedings of 2016 IEEE Conference on Computer Vision and Pattern Recognition, Jun. 27-30, 2016, 10 pages, retrieved from <https://www.cv-foundation.org/openaccess/content_cvpr_2016/papers/Ros_The_SYNTHIA_Dataset_CVPR_2016_paper.pdf> on Sep. 9, 2018.

Shrivastava, Ashish, et al., "Learning From Simulated and Unsupervised Images Through Adversarial Training", Apple, Inc., Nov. 15, 2016, 16 pages, retrieved from <https://arxiv.org/pdf/2.07828.pdf> on Sep. 9, 2018.

Spotcam.com, "Wi-Fi Home Monitoring Cloud Camera with Free Cloud Storage", Jun. 6, 2016 to Oct. 27, 2017, Internet Archive retrieved from <https://web.archive.org/web/*/https://www.myspotcam.com/en> on Sep. 9, 2018, 5 pages.

True-Systems.com, "Highly Detailed Soundfield", Nov. 28, 1999 to Sep. 3, 2018, Internet Archive, retrieved from <https://web.archive.org/web/*/http://www.true-systems.com/> on Sep. 9, 2018, 6 pages.

Wikipedia Contributors, "Figure Eight Inc. (formerly CrowdFlower)", Wikipedia The Free Encyclopedia, Dec. 2, 2011, retrieved from <https://en.wikipedia.org/wiki/Figure_Eight_Inc.> on Sep. 9, 2018, 6 pages.

* cited by examiner

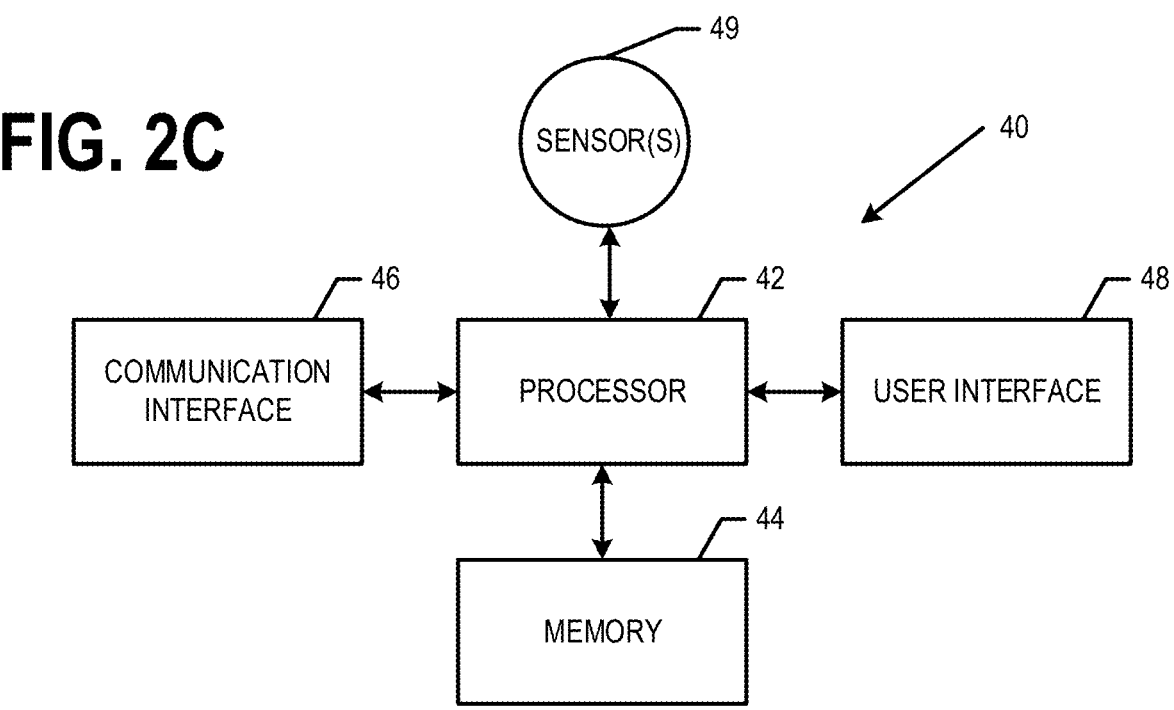

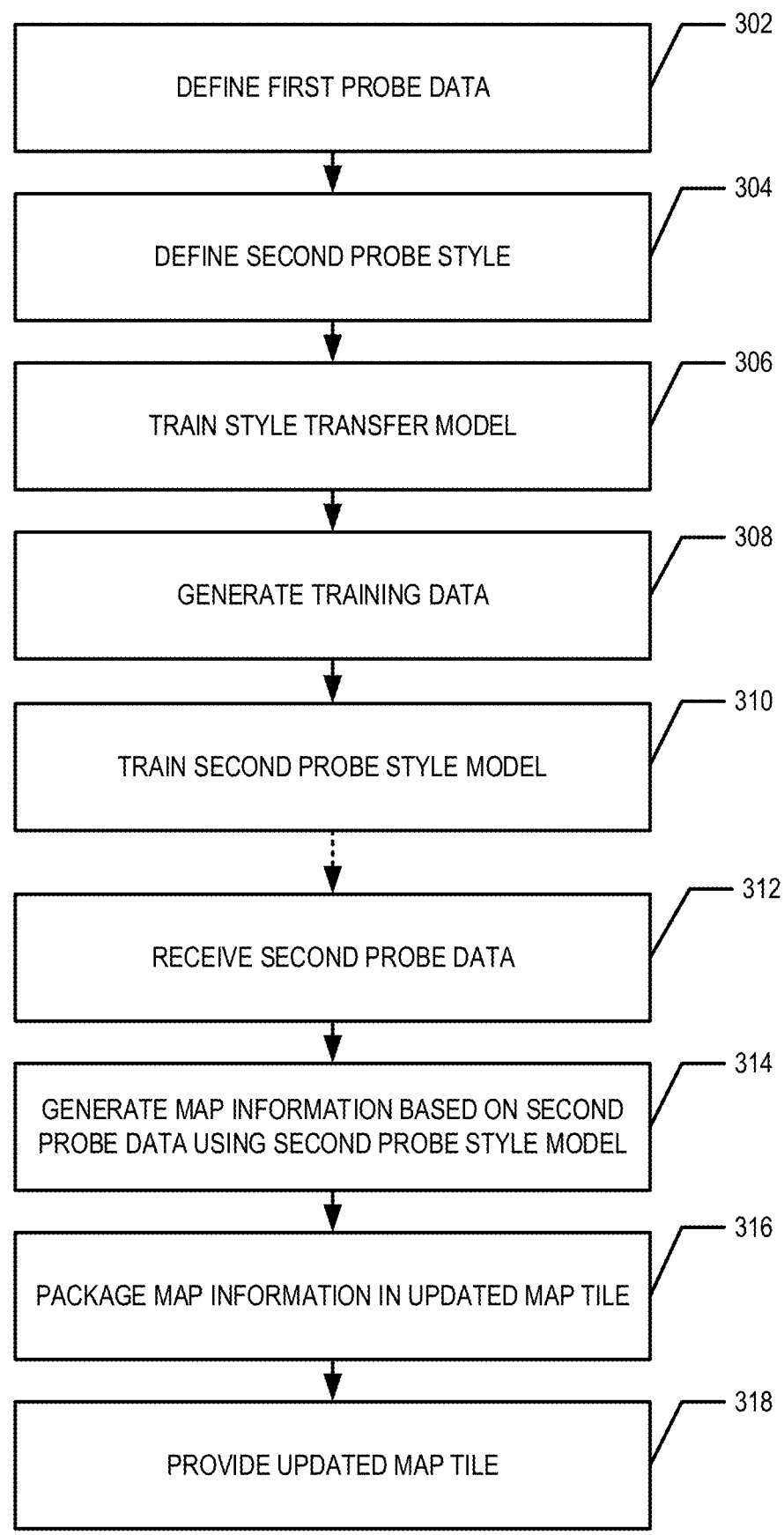

MACHINE LEARNING A FEATURE DETECTOR USING SYNTHETIC TRAINING DATA

TECHNOLOGICAL FIELD

An example embodiment relates generally to machine learning. An example embodiment relates generally to training a feature detection model using a training set comprising synthetic training images.

BACKGROUND

Many real-world machine learning problems require a large number of labeled examples in order to converge to an optimal and acceptable level of performance. Machine learning solutions are generally employed when hand-programming solutions is too complex and/or hand-programming solutions by humans is too slow and/or expensive. An example of one such problem is the generation and maintenance of high definition maps. However, machine learning requires a significant set of training data. For example, if a machine learning algorithm does not have enough training data to effectively learn to model the target domain, then the machine learning algorithm will not perform well. However, it is expensive and time consuming to produce training data. For example, in the autonomous self-driving vehicle and map making spaces, expensive collection vehicles are required to collect imagery and/or sensor data, teams of human labelers are required to annotate the images and/or sensor data before the imagery and/or sensor data may be used as training data.

BRIEF SUMMARY OF SOME EXAMPLE EMBODIMENTS

Various embodiments provide a technical solution to the technical problem of generating sufficient training information/data for training a second probe style model such as a neural network, deep net, and/or other model via machine learning. In various embodiments, the second probe style model is configured to analyze second probe information/data captured by one or more second probe sensors of a second probe apparatus to extract and/or generate information/data therefrom. An example embodiment provides methods, apparatuses, computer program products, systems, and/or the like for generating training information/data having a second probe style based on first probe information/data of a first probe style, wherein the second probe style and the first probe style are different. In an example embodiment, instances of first probe information/data are annotated, labeled, and/or the like and instances of training information/data correspond to the instances of first probe information/data comprise annotations, labels, and/or the like based on the annotations, labels, and/or the like of the corresponding instance of first probe information/data.

In an example embodiment, the first probe information/data comprises instances of sensor information/data that were captured by one or more first probe sensors of a first probe apparatus. In an example embodiment, the first probe apparatus is onboard a vehicle traversing at least a portion of a road network. Characteristics of the one or more first probe sensors define the first probe style. In an example embodiment, the one first probe sensors may be one or more virtual sensors configured to capture sensor information/data of a first probe style in a virtual environment. For example, the first probe information/data may comprise instances of virtual sensor information/data that were captured by one or more virtual sensors within a virtual environment. Characteristics of the virtual environment and/or the virtual sensors define the first probe style.

In an example embodiment, the training information/data is used to train a second probe style model such as a neural network, deep net, or other model configured to analyze instances of second probe information/data comprising sensor information/data captured by one or more sensors of a second probe apparatus. The second probe style corresponds to expected and/or measured characteristics of the one or more sensors. In an example embodiment, the second probe apparatus may capture instances of information/data while onboard a vehicle traversing at least a portion of a road network. The instances of information/data may then be analyzed by the trained second probe style model (e.g., neural network, deep net, and/or other model) to extract map information/data therefrom. In an example embodiment, the extracted map information/data may be used to generate and/or update a digital map.

For example, instances of first probe information/data, training information/data, and second probe information/data may comprise images and/or image data (e.g., digital images) and the second probe style model (e.g., neural network, deep net, or other model) may be a feature detector configured to identify one or more features such as static and/or unchanging features (e.g., features that do not substantially change over the course of a day, a week, a month, a year, and/or the like) and/or other features within the image and/or image data. In an example embodiment, the first probe information/data, training information/data, and/or second probe information/data may further comprise location information/data corresponding to a location at which the information/data was captured. For example, the location information/data may comprise a geolocation such as latitude and longitude, and/or the like. Thus, the feature detector may be configured to provide map information/data comprising feature information/data corresponding to an identified feature including a geolocation of the feature and/or other identifying information/data for the feature (e.g., an image of the feature, a description of the feature, a classification of the feature, and/or the like).

The map information/data extracted and/or generated by the feature detector may be used to update a digital map. For example, the digital map may be a high definition map that may be used for navigation functions for an autonomous, self-driving vehicle, an advanced driver assistances system (ADAS), and/or a human operator. For example, the digital map and/or portions thereof may be used to perform navigation functions such as localization, route determination, route guidance, provision of traffic information/data, and/or the like.

In an example embodiment, map information/data may be generated and/or extracted from second probe information/data using a machine learning trained second probe style model. First probe data is defined. An instance of first probe data comprises one or more labels and sensor data of a first probe style. A style transfer model generates training data based on at least a portion of the first probe data. An instance of training data corresponds to an instance of first probe data and sensor data in a second probe style. The second probe style is different from the first probe style. A second probe style model is trained using machine learning and at least a portion of the training data. The second probe style model is used to analyze one or more instances of second probe data of the second probe style to extract map information/data from the second probe data. Each instance of second probe data is captured by one or more second probe sensors of a second probe apparatus.

In accordance with an example embodiment, a method is provided. In an example embodiment, the method comprises defining, via a network apparatus, first probe data. An instance of first probe data comprising one or more labels and sensor data of a first probe style. The method further comprises generating, via a style transfer model operating at least in part on the network apparatus, training data based on at least a portion of the first probe data. An instance of training data corresponds to an instance of first probe data and sensor data in a second probe style. The second probe style is different from the first probe style. The method further comprises training, via the network apparatus, a second probe style model using machine learning and at least a portion of the training data. The second probe style model is used to analyze one or more instances of second probe data of the second probe style to extract map information from the second probe data. Each instance of second probe data is captured by one or more second probe sensors of a second probe apparatus.

In an example embodiment, the second probe style corresponds to characteristics of the one or more second probe sensors. In an example embodiment, the style transfer model is a generative adversarial network.

In an example embodiment, the instance of first probe data is an annotated instance of data of the first probe style and is captured by one or more first probe sensors of a first probe apparatus. In an example embodiment, the method further comprises generating the instance of first probe data by capturing synthetic sensor data with a virtual sensor within a virtual environment. In an example embodiment, the method further comprises automatically generating one or more labels for the instance of first probe data based on the virtual environment.

In an example embodiment, (a) two or more instances of training data correspond to the same instance of first probe data and (b) the two or more instances of training data are different in at least one feature. In an example embodiment, (a) an instance of training data is an image, (b) the one or more second probe sensors comprise an imaging device configured to capture an image of the second probe style, and (c) the second probe style model is a feature detection model used to generate map information for a digital map.

In an example embodiment, the method further comprises receiving, by the network apparatus, at least one instance of second probe data comprising sensor data (a) captured by one or more second probe sensors and (b) of a second probe style; analyzing the at least one instance of second probe data using the second probe style model to extract map information from the at least one instance of second probe data; updating, by the network apparatus, a digital map based on the map information; and providing, by the network apparatus, one or more tiles of the digital map to one or more vehicle apparatuses, wherein at least one of the one or more vehicle apparatuses performs at least one navigation function using the one or more tiles of the digital map.

In accordance with an example embodiment, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least define first probe data. An instance of first probe data comprising one or more labels and sensor data of a first probe style. The at least one memory and the computer program code are further configured to, with the processor, cause the apparatus to at least generate, via a style transfer model, training data based on at least a portion of the first probe data. An instance of training data corresponds to an instance of first probe data and sensor data in a second probe style. The second probe style is different from the first probe style. The at least one memory and the computer program code are further configured to, with the processor, cause the apparatus to at least train a second probe style model using machine learning and at least a portion of the training data. The second probe style model is used to analyze one or more instances of second probe data of the second probe style to extract map information from the second probe data. Each instance of second probe data is captured by one or more second probe sensors of a second probe apparatus.

In an example embodiment, the second probe style corresponds to characteristics of the one or more second probe sensors. In an example embodiment, the style transfer model is a generative adversarial network.

In an example embodiment, the instance of first probe data is an annotated instance of data of the first probe style and is captured by one or more first probe sensors of a first probe apparatus. In an example embodiment, the at least one memory and the computer program code are further configured to, with the processor, cause the apparatus to at least generate the instance of first probe data by capturing synthetic sensor data with a virtual sensor within a virtual environment. In an example embodiment, the at least one memory and the computer program code are further configured to, with the processor, cause the apparatus to at least automatically generate one or more labels for the instance of first probe data based on the virtual environment.

In an example embodiment, (a) two or more instances of training data correspond to the same instance of first probe data and (b) the two or more instances of training data are different in at least one feature. In an example embodiment, (a) an instance of training data is an image, (b) the one or more second probe sensors comprise an imaging device configured to capture an image of the second probe style, and (c) the second probe style model is a feature detection model used to generate map information for a digital map.

In an example embodiment, the at least one memory and the computer program code are further configured to, with the processor, cause the apparatus to at least receive at least one instance of second probe data comprising sensor data (a) captured by one or more second probe sensors and (b) of a second probe style; analyze the at least one instance of second probe data using the second probe style model to extract map information from the at least one instance of second probe data; update a digital map based on the map information; and provide one or more tiles of the digital map to one or more vehicle apparatuses, wherein at least one of the one or more vehicle apparatuses performs at least one navigation function using the one or more tiles of the digital map.

In accordance with an example embodiment, a computer program product is provided that comprises at least one non-transitory computer-readable storage medium having computer-executable program code instructions stored therein. The computer-executable program code instructions comprise program code instructions that are configured, when executed by a processor of an apparatus, to cause the apparatus to define first probe data. An instance of first probe data comprising one or more labels and sensor data of a first probe style. The computer-executable program code instructions comprise program code instructions that are further configured, when executed by the processor of the apparatus, to cause the apparatus to generate, via a style transfer model, training data based on at least a portion of the first probe data. An instance of training data corresponds to an instance of first probe data and sensor data in a second probe style. The second probe style is different from the first probe style. The computer-executable program code instructions comprise program code instructions that are further configured, when executed by the processor of the apparatus, to cause the apparatus to train a second probe style model using machine learning and at least a portion of the training data. The second probe style model is used to analyze one or more instances of second probe data of the second probe style to extract map information from the second probe data. Each instance of second probe data is captured by one or more second probe sensors of a second probe apparatus.

In an example embodiment, the second probe style corresponds to characteristics of the one or more second probe sensors. In an example embodiment, the style transfer model is a generative adversarial network.

In an example embodiment, the instance of first probe data is an annotated instance of data of the first probe style and is captured by one or more first probe sensors of a first probe apparatus. In an example embodiment, the computer-executable program code instructions comprise program code instructions that are further configured, when executed by the processor of the apparatus, to cause the apparatus to generate the instance of first probe data by capturing synthetic sensor data with a virtual sensor within a virtual environment. In an example embodiment, the computer-executable program code instructions comprise program code instructions that are further configured, when executed by the processor of the apparatus, to cause the apparatus to automatically generate one or more labels for the instance of first probe data based on the virtual environment.

In an example embodiment, (a) two or more instances of training data correspond to the same instance of first probe data and (b) the two or more instances of training data are different in at least one feature. In an example embodiment, (a) an instance of training data is an image, (b) the one or more second probe sensors comprise an imaging device configured to capture an image of the second probe style, and (c) the second probe style model is a feature detection model used to generate map information for a digital map.

In an example embodiment, the computer-executable program code instructions comprise program code instructions that are further configured, when executed by the processor of the apparatus, to cause the apparatus to receive at least one instance of second probe data comprising sensor data (a) captured by one or more second probe sensors and (b) of a second probe style; analyze the at least one instance of second probe data using the second probe style model to extract map information from the at least one instance of second probe data; update a digital map based on the map information; and provide one or more tiles of the digital map to one or more vehicle apparatuses, wherein at least one of the one or more vehicle apparatuses performs at least one navigation function using the one or more tiles of the digital map.

In accordance with yet another example embodiment of the present invention, an apparatus is provided that comprises means for defining first probe data. An instance of first probe data comprising one or more labels and sensor data of a first probe style. The apparatus further comprises means for generating, via a style transfer model, training data based on at least a portion of the first probe data. An instance of training data corresponds to an instance of first probe data and sensor data in a second probe style. The second probe style is different from the first probe style. The apparatus further comprises means for training, via the network apparatus, a second probe style model using machine learning and at least a portion of the training data. The second probe style model is used to analyze one or more instances of second probe data of the second probe style to extract map information from the second probe data. Each instance of second probe data is captured by one or more second probe sensors of a second probe apparatus.

BRIEF DESCRIPTION OF THE DRAWINGS

Figure 1:
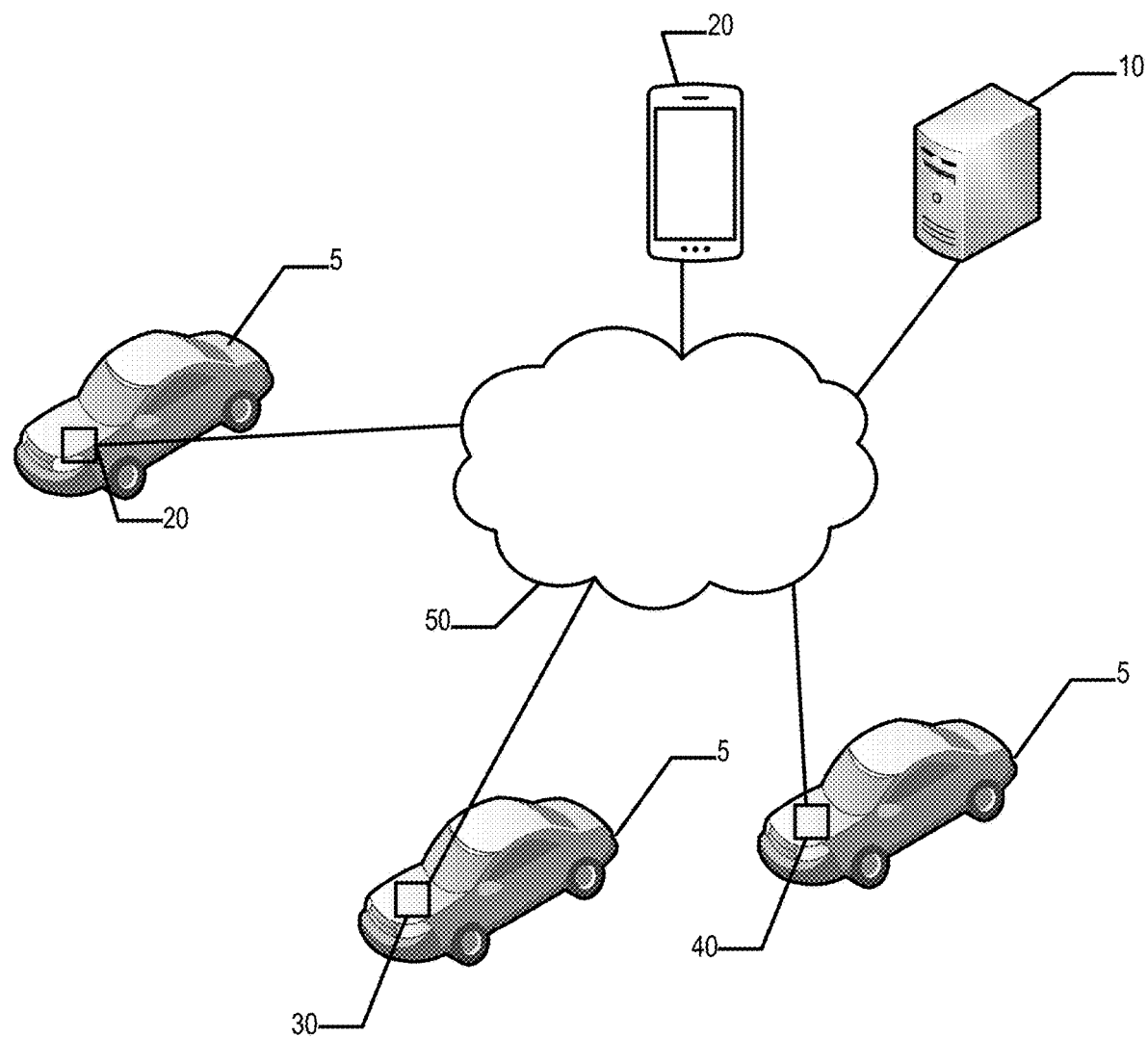
Figure 2A:
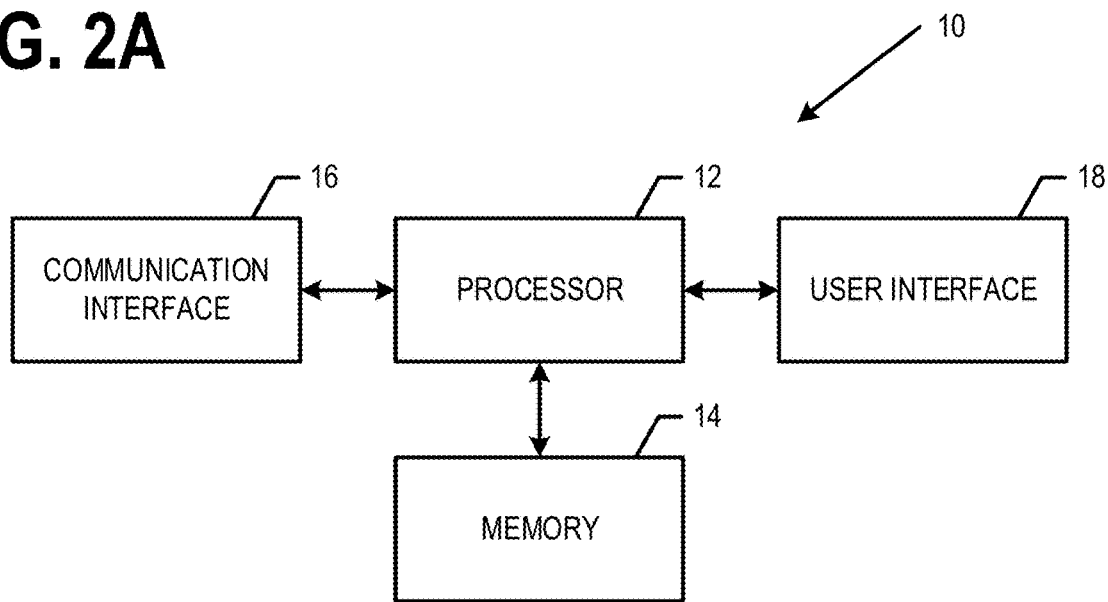
Figure 2B:
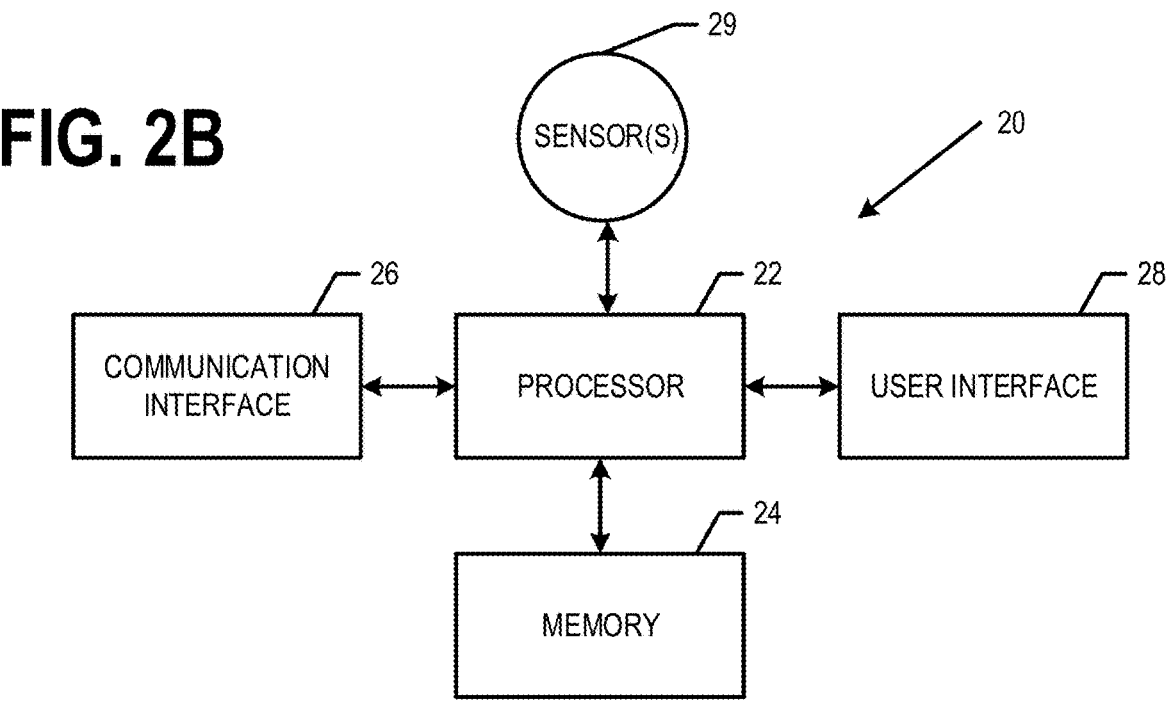
Figure 4:
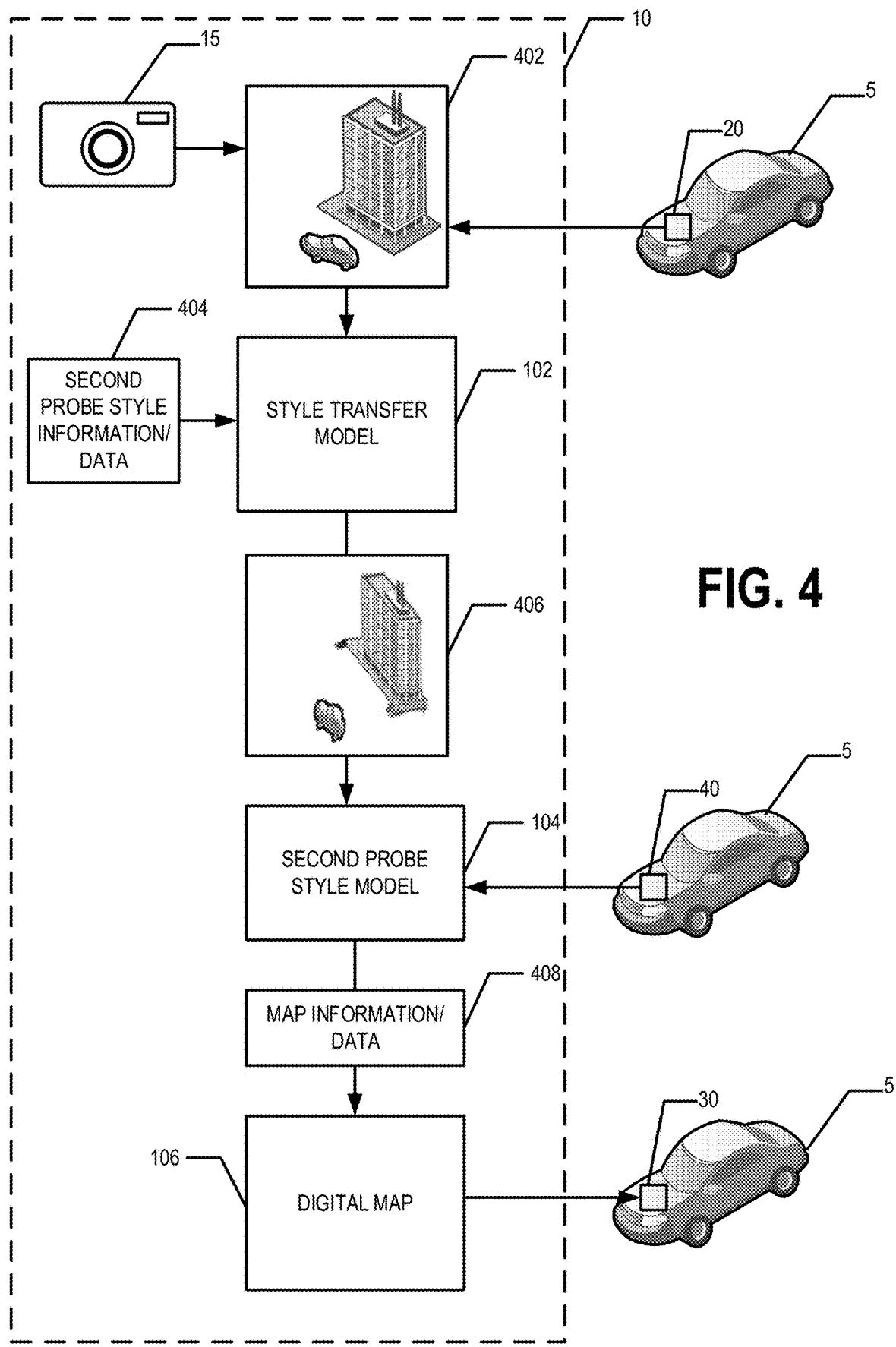

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a first probe apparatus that may be specifically configured in accordance with an example embodiment;

FIG. 2C is a block diagram of a second probe apparatus that may be specifically configured in accordance with an example embodiment;

FIG. 3 is a flowchart illustrating operations performed, such as by the network apparatus of FIG. 2A to provide an updated map based on map information/data extracted from second probe information/data by a second probe style model trained with synthetically generated training information/data, in accordance with an example embodiment; and FIG. 4 is an example data flow diagram, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, and computer program products are provided in accordance with an example embodiment in order to generate synthetic training information/data for training a second probe style model such as neural network, deep net, and/or other model via machine learning. In various embodiments, the synthetic training information/data is generated by a style transfer model. In an example embodiment, a style transfer model may be a generative adversarial network (GAN) that is trained to generate and/or output training information/data of a second probe style based on input first probe information/data of a first probe style. In various embodiments, the second probe style is different from the first probe style. In various embodiments, an instance of first probe information/data is generated by capturing sensor information/data of a first probe style using one or more virtual sensors within a virtual environment. For example, the one or more first probe sensors may be virtual sensors that capture sensor information/data within a virtual environment. In an example embodiment, the one or more virtual sensors may be virtual cameras (e.g., a software-based camera) and the virtual environment may be a three-dimensional (3D) virtual environment and/or the like generated by, for example, a 3D graphics or gaming engine. In an example embodiment, an instance of first probe information/data comprises sensor information/data captured by one or more first probe sensors of a first probe apparatus. For example, the first probe apparatus may be onboard a vehicle traversing at least a portin of a road network. The one or more virtual sensors and/or one or more first probe sensors define the first probe style of the instance of first probe information/data. The second probe style corresponds to an expected and/or measured style of one or more sensors of a second probe apparatus. The second probe style model is to be trained to analyze second probe information/data captured by one or more sensors of one or more second probe apparatuses. Thus, the second probe information/data to be analyzed by the second probe style model is expected to be in the second probe style.

In various embodiments, the term "style" refers to surface textures, colors, lighting, and/or an aspect of an instance of information/data (e.g., instance of first probe information/data, instance of style-determining information/data, instance of training information/data, instance of second probe information/data, and/or the like) that is affected by the characteristics of the one or more sensors used to capture the information/data (e.g., first probe sensors (including real and/or virtual first probe sensors), second probe sensors, and/or the like). For example, if the instance of information/data comprises and/or consists of an image, the style corresponding to the instance of information/data may include a color distribution of the image, a lighting distribution of the image, warping of the 3D scene caused by the capturing of the two-dimensional (2D) image (e.g., effects of generating a 2D projection of the 3D scene using the particular sensors), surface texture, and/or the like.

Thus, a style transfer model is trained to generate training information/data from first probe information/data. The training information/data is generated to have a second probe style and the first probe information/data is of a first probe style defined by the one or more first probe sensors and/or virtual sensors used to capture the first probe information/data. The training information/data is then used to train a second probe style model that may be used to analyze second probe information/data captured by one or more sensors of a second probe apparatus. The second probe information/data is of the second probe style defined by the one or more sensors of the second probe apparatus. The second probe style model analyzes the second probe information/data to extract map information/data therefrom. In an example embodiment, the map information/data comprises feature information/data such as a feature location (e.g., latitude and longitude, location relative to one or more other features or aspects in the vicinity of the feature, and/or the like). The map information/data may be used to generate and/or update a digital map and/or one or more tiles of a digital map. For example, the digital map may be a high definition map that may be used for navigation functions for an autonomous, self-driving vehicle, an advanced driver assistances system (ADAS), and/or a human operator. For example, the digital map and/or one or more tiles thereof may be provided to a vehicle apparatus onboard a vehicle and used by the vehicle apparatus to perform navigation functions such as localization, route determination, lane level route determination, lane maintenance, route guidance, lane level route guidance, provision of traffic information/data, provision of lane level traffic information/data and/or the like.

FIG. 1 provides an illustration of an example system that can be used in conjunction with various embodiments of the present invention. As shown in FIG. 1, the system may include one or more network apparatuses 10, one or more first probe apparatuses 20, wherein each first probe apparatus 20 is disposed on a vehicle 5, one or more vehicle apparatuses 30, wherein each vehicle apparatus 30 is disposed on a vehicle 5, one or more second probe apparatuses 40, wherein each second probe apparatus 40 is disposed on a vehicle 5, one or more networks 50, and/or the like. In various embodiments, the first probe apparatus 20, vehicle apparatus 30, and/or second probe apparatus 40 may be an in vehicle navigation system, vehicle control system, a mobile computing device, a mobile data gathering platform, and/or the like. For example, a first probe apparatus 20, vehicle apparatus 30, and/or second probe apparatus 40 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the first probe apparatus 20, vehicle apparatus 30, and/or second probe apparatus 40 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the first probe apparatus 20, vehicle apparatus 30, and/or second probe apparatus 40 is configured to autonomously drive a vehicle 5 may perform multiple functions that are similar to those performed by a first probe apparatus 20, vehicle apparatus 30, and/or second probe apparatus 40 configured to be an ADAS (e.g., lane keeping, lane change assistance, maintaining a lane, merging, etc.). In some embodiments, a first probe apparatus 20, vehicle apparatus 30, and/or second probe apparatus 40 may be onboard a personal vehicle, commercial vehicle, public transportation vehicle, fleet vehicle, and/or other vehicle. In various embodiments, the first probe apparatus 20, vehicle apparatus 30, and/or second probe apparatus 40 may be a smartphone, tablet, personal digital assistant (PDA), personal computer, desktop computer, laptop, and/or other mobile computing device. In an example embodiment, the first probe apparatus 20 and the second probe apparatus 40 are onboard fleet vehicles and comprise a mobile data gathering platform. In an example embodiment, a vehicle apparatus 30 is onboard a vehicle 5 and is used to perform one or more navigation functions corresponding to the vehicle 5 traversing at least a portion of a road network. In an example embodiment, the network apparatus 10 may be a server, group of servers, distributed computing system, and/or other computing system. For example, the network apparatus 10 may be in communication with one or more first probe apparatuses 20, one or more vehicle apparatuses 30, one or more second probe apparatuses 40, and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to define, receive, and/or generate first probe information/data, define a second probe style and/or receive one or more instances of style-determining data, train a style transfer model, use the style transfer model to generate training information/data of the second probe style based on the first probe information/data, train a second probe style model for analyzing second probe information/data of the second probe style, receive and analyze second probe information/data of the second probe style using the second probe style model, generate and/or extract map information/data via the analysis of the second probe information/data, generate and/or update a digital map and/or one or more tiles of a digital map based on the map information/data, provide the generated and/or updated digital map and/or one or more tiles thereof, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, a first probe apparatus 20 is onboard a vehicle 5. In an example embodiment, the first probe apparatus 20 may be configured to capture sensor information/data of a first probe style and provide the captured sensor information/data to one or more network apparatuses 10. For example, the first probe apparatus 20 may comprise and/or be in communication with one more first probe sensors onboard the vehicle 5 for capturing sensor information/data that encodes information/data corresponding to a road network and/or the environment surrounding at least a portion of the road network. The sensor information/data may comprise location information/data indicating a location (e.g., geolocation such as latitude and longitude and/or the like) of the vehicle 5 and/or first probe apparatus 20 when the corresponding sensor information/data was captured. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like.

In an example embodiment, as shown in FIG. 2B, the first probe apparatus 20 may comprise a processor 22, memory 24, a communications interface 26, a user interface 28, one or more first probe sensors 29 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the first probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a second probe apparatus 40 is onboard a vehicle 5. In an example embodiment, the second probe apparatus 40 may be configured to capture sensor information/data of a second probe style and provide the captured sensor information/data to one or more network apparatuses 10. For example, the second probe apparatus 40 may comprise and/or be in communication with one more second probe sensors onboard the vehicle 5 for capturing sensor information/data that encodes information/data corresponding to a road network and/or the environment surrounding at least a portion of the road network. In an example embodiment, the one or more second probe sensors are configured differently from the one or more first probe sensors and/or comprise at least one sensor that is different from the first probe sensors. The sensor information/data may comprise location information/data indicating a location (e.g., geolocation such as latitude and longitude and/or the like) of the vehicle 5 and/or second probe apparatus 40 when the corresponding sensor information/data was captured. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like.

In an example embodiment, as shown in FIG. 2C, the second probe apparatus 40 may comprise a processor 42, memory 44, a communications interface 46, a user interface 48, one or more second probe sensors 49 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the second probe apparatus 40 to determine one or more features of the corresponding vehicle's 5 surroundings and/ or monitor the vehicle's 5 operating parameters), and/or other components configured to perform various operations, procedures, functions or the like described herein. In at least some example embodiments, the memory 44 is non-transitory.

In an example embodiment, a vehicle apparatus 30 is onboard a vehicle 5. In an example embodiment, the vehicle apparatus 30 may be configured to provide navigation and/or route information/data to a user (e.g., an operator of the vehicle 5). In an example embodiment, the vehicle apparatus 30 may be configured to autonomously drive a vehicle 5 and/or assist in control of a vehicle 5 (e.g., an ADAS) in accordance with navigation and/or route information. In an example embodiment, the vehicle apparatus 30 may be configured to gather, collect, capture, and/or the like instances of location information/data as the vehicle 5 moves through the road network and/or a portion thereof. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like. In an example embodiment, an instance of location information/data and a digital map and/or one or more tiles of digital map (e.g., provided by the network apparatus 10) may be used to perform one or more navigation functions. For example, the vehicle apparatus 30 may be configured to use captured location information/data and a digital map and/or one or more tiles of a digital map to perform one or more navigation functions as the vehicle 5 traverses the road network and/or a portion thereof. In an example embodiment, the one or more navigation functions may comprise one or more of localization, route determination, lane level route determination, lane maintenance, route guidance, lane level route guidance, provision of traffic information/data, provision of lane level traffic information/data and/or the like.

In an example embodiment, the navigation apparatus 30 may comprise one or more elements similar to those of the first probe apparatus 20 and/or second probe apparatus 40. For example, the vehicle apparatus 30 may comprise a processor, memory, a communications interface, a user interface, one or more sensors (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 30 to determine one or more features of the corresponding vehicle's 5 surroundings, monitor the vehicle's 5 operating parameters, and/or the like), and/or other components configured to perform various operations, procedures, functions or the like (e.g., navigation functions) described herein. In at least some example embodiments, the memory is non-transitory.

In an example embodiment, the network apparatus 10 may be in communication with one or more of first probe apparatuses 20, one or more vehicle apparatuses 30, and/or one or more second probe apparatuses 40. In an example embodiment, the network apparatus 10 may train a style transfer network via machine learning, use a style transfer network and first probe data to generate training data, train a second probe style model for analyzing second probe information/data of a second probe style, receive second probe information/data captured by one or more vehicle apparatuses, use the second probe style model to generate and/or extract map information/data from the second probe information/data of the second probe style, update a digital map and/or one or more tiles of a digital map based on the map information/data, provide the updated digital map and/or one or more tiles thereof to one or more navigation devices, and/or the like.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a first probe apparatus 20, vehicle apparatus 30, and/or second probe apparatus 40 may be in communication with a network apparatus 10 via the network 50. For example, a first probe apparatus 20, vehicle apparatus 30, and/or second probe apparatus 40 may communicate with the network apparatus 10 via a network, such as the Cloud. For example, the Cloud may be a computer network that provides shared computer processing resources and data to computers and other devices connected thereto. For example, the first probe apparatus 20, vehicle apparatus 30, and/or second probe apparatus 40 may be configured to receive one or more map tiles of a digital map from the network apparatus 10 or another map service connected via the network 50, traffic information/data (embedded in a map tile of a digital map and/or separate therefrom), and/or provide captured information/data captured by the first probe sensors 29 and/or second probe sensors 49 to the network apparatus 10, and/or the like.

Certain example embodiments of the first probe apparatus 20, vehicle apparatus 30, and/or second probe apparatus 40 and the network apparatus 10 are described in more detail below with respect to FIGS. 2A, 2B, and 2C.

II. Example Operation

Example embodiments provide methods, apparatus, systems, computer program products, and/or the like for generating synthetic training information/data for training a second probe style model using machine learning. In various embodiments, the synthetic training data is generated by a style transfer model that transfers one or more instances of first probe information/data of a first probe style to one or more instances of training information/data of a second probe style. In an example embodiment, the style transfer model is trained via machine learning. For example, the style transfer model may be a neural network, deep net, and/or other model trained as a GAN. In an example embodiment, the style transfer model is trained to receive as input an instance of first probe information/data of a first probe style and generate one or more instances of training information/data of a second probe style as output. The training data generated by the style transfer model may then be used to train the second probe style model. For example, the second probe style model may be trained using machine learning to extract and/or generate map information/data from second probe information/data of the second probe style.

The extracted and/or generated map information/data may be used to update a digital map and/or one or more tiles of a digital map. For example, the map information/data may comprise information/data corresponding to one or more new links, lanes, road segments, intersections, points of interest, static and/or unchanging features that may be used for localization processes, and/or the like to be added to one or more layers of the digital map. In another example, the map information/data may comprise one or more updates to information/data of the digital map corresponding to links, lanes, road segments, intersections, points of interest, static and/or unchanging features that may be used for localization processes, and/or the like of one or more layers of the digital map. The updated digital map and/or one or more tiles thereof may be provided such that a vehicle apparatus 30 may use the updated digital map and/or one or more tiles thereof to perform one or more navigation functions for the vehicle 5.

FIGS. 3 and 4 provide a flowchart and a data flow diagram for providing an updated digital map and/or one or more tiles of a digital map, in accordance with an example embodiment. Starting at block 302, the first probe data is defined. For example, the network apparatus 10 may define the first probe data. For example, the network apparatus 10 may comprise means, such as the processor 12, memory 14, communications interface 16, user interface 18, and/or the like, for defining the first probe data. In an example embodiment, the first probe data may be automatically defined and/or generated by the network apparatus 10. In an example embodiment, the network apparatus 10 may receive one or more instances of first probe data and/or portions thereof from one or more first probe apparatuses 20. For example, the first probe apparatuses 20 may provide one or more instances of sensor information/data which may be used as a portion of the first probe data. In an example embodiment, user input is received (e.g., via the user interface 18) defining and/or selecting the first probe data. For example, the user input may be a selection of a set data for use as the of first probe data, a query used to identify and define first probe data from a database and/or other data store, and/or the like.

In an example embodiment, an instance of first probe data comprises sensor information/data captured by one or more first probe sensors 29 and one or more annotations, labels, and/or the like. For example, instances of first probe data comprise sensor information/data captured by one or more first probe sensors 29. For example, a first probe sensor 29 may be a sensor that is part of and/or in communication with a first probe apparatus 20 onboard a vehicle 5. The first probe apparatus 20 may cause the one or more first sensors 29 to capture sensor information/data and may then provide the sensor information/data to the network apparatus 10 (e.g., via communications interfaces 26, 16). One or more users may view and/or review the sensor information/data via a user interface 18 and/or a user interface of a user computing entity that is in communication with the network apparatus 10, a client of the network apparatus 10, and/or the like and provide user input (e.g., via a keyboard, mouse, joystick, and/or other input device of the user computing entity) to define, add, and/or provide one or more annotations and/or labels that are associated with the sensor information/data. Thus, an instance of first probe data may comprise sensor information/data and manually provided annotations, labels, and/or the like.

In an example embodiment, a first probe sensor 29 is a virtual sensor 15 configured to capture sensor information/data in a virtual environment. For example, the network apparatus 10 may comprise one or more GPUs configured to function as a 3D graphics and/or gaming engine. The 3D graphics and/or gaming engine may generate a virtual environment comprising a virtual town, scene, and/or the like and the virtual sensor(s) 15 may be used to capture sensor information/data corresponding to a scene within the virtual environment. For example, the virtual sensor(s) 15 may comprise a software camera and/or other virtual sensors for generating sensor information/data based on the scene within the virtual environment. In an example embodiment, the virtual sensors and/or the virtual environment may automatically provide one or more annotations, labels, and/or the like. In an example embodiment, the annotations, labels, and/or the like may be manually applied and/or associated with the virtual sensor information/data similar to as described above. For example, the annotations, labels, and/or the like may identify one or more features within the instance of first probe information/data.

For example, the annotations, labels, and/or the like may identify one or more features within the instance of first probe data. For example, the instance of first probe data 402 may comprise a label identifying the building within the sensor information/data and/or a label identifying the vehicle within the sensor information/data. In an example, embodiment, the annotations and/or labels may comprise further information/data regarding one or more features within the sensor information/data such as a ground true location of the feature, whether the feature is a static and/or unchanging feature (such as the building) or whether the feature is a transient feature (such as the vehicle). For example, the annotations, labels, and/or the like may highlight features within the sensor information/data to which the style transfer model and/or second probe style model should pay attention to, ignore, and/or the like. In various embodiments, the sensor information/data of an instance of first probe information/data may comprise an image, an image data file, a vector of numbers, and/or the like.

The one or more first probe sensors 29 define a first probe style. In various embodiments, the first probe style is a multi-variable distribution describing various characteristics and/or qualities of the sensor information/data captured by the first probe sensors 29. For example, if the instance of first probe information/data comprises and/or consists of an image, the first probe style corresponding to the instance of first probe information/data may include a color distribution of the image, a lighting distribution of the image, warping of the 3D scene caused by the capturing of the two-dimensional (2D) image (e.g., effects of generating a 2D projection of the 3D scene using the particular sensors), surface texture, and/or the like. Thus, the first probe style is defined by characteristics and/or qualities of the first probe sensors 29.

In an example embodiment, an instance of first probe information/data comprises sensor information/data that comprises an image and/or image data (e.g., a digital image). For example, the first probe sensors 29 may comprise one or more image capture devices (e.g., software camera(s); digital camera(s); two dimensional (2D) and/or three dimensional (3D) light detection and ranging (LiDAR) system(s); long, medium, and/or short range radio detection and ranging (RADAR) system(s); electromagnetic sensor(s); (near-)infrared (IR) camera(s); optical camera(s); 3D camera(s); 360° camera(s); and/or the like) for capturing images, image data, and/or the like. In various embodiments, an instance of first probe information/data may comprise various sensor information/data captured by the one or more probe sensors 29 in addition to and/or in place of one or more images and/or image data.

At block 304, the second probe style is defined. For example, the network apparatus 10 may define the second probe style. For example, the network apparatus 10 may comprise means, such as processor 12, memory 14, and/or the like, for defining the second probe style. In an example embodiment, the second probe style is a multi-variable distribution that describes the expected or the observed distribution of various variables of sensor information/data captured by the one or more second probe sensors 49 of the second probe apparatus 40. For example, the second probe style describes various characteristics and/or qualities of the sensor information/data captured by the second probe sensors 49. For example, if an instance of second probe information/data comprises and/or consists of an image, the second probe style corresponding to the instance of second probe information/data may include a color distribution of the image, a lighting distribution of the image, warping of the 3D scene caused by the capturing of the two-dimensional (2D) image (e.g., effects of generating a 2D projection of the 3D scene using the particular sensors), surface texture, and/or the like. Thus, the second probe style is defined by the observed and/or expected characteristics and/or qualities of the first probe sensors 49. In various embodiments, the second probe style is defined by second probe style information/data 404. In an example embodiment, the second probe style information/data 404 is generated and/or extracted through an analysis of one or more instances of second probe information/data. For example, the network apparatus 10 may perform an analysis (e.g., via the processor 12) of one or more instances of second probe information/data to generate the second probe style information/data 404 or the network apparatus 10 may receive (e.g., via the communication interface 18) second probe style information/data 404. In another example, a model that describes the expected characteristics and/or qualities of one or more second probe sensors 49 may be used to generate and/or define the second probe style information/data 404. In an example embodiment, the second probe style information/data 404 encodes and/or describes the multi-variable distribution that describes the expected and/or observed characteristics and/or qualities of the one or more second probe sensors 49.

Continuing to block 306, the style transfer model 102 is trained. For example, the network apparatus 10 may train the style transfer model 102. For example, the network apparatus 10 may comprise means, such as the processor 12, memory 14, communications interface 18, and/or the like, for training the style transfer model 102. In an example embodiment, the style transfer model 102 operates and/or runs at least in part on the network apparatus 10 and/or another computing entity in communication with the network apparatus 10. In an example embodiment, the style transfer model 102 is a neural network, deep net, model and/or the like. In an example embodiment, the style transfer model 102 is a pair of neural networks, deep nets, models, and/or the like. For example, the style transfer model 102 may be a GAN comprising a generative model and a discriminator model. In various embodiments, the style transfer model 102 may be configured to receive one or more instances of first probe information/data of a first probe style and provide as output one or more instances of training information/data of a second probe style. In an example embodiment, an instance of training information/data may comprise sensor information/data and annotations, labels, and/or the like. For example, the instance of training data 406, which corresponds to the instance of first probe data 402, may comprise annotations, labels, and/or the like identifying the building within the sensor information/data and/or a label identifying the vehicle within the sensor information/data based on the annotations, labels, and/or the like of the instance of first probe data 402. The sensor information/data of the instance of training data 406 is in accordance with the second probe style as defined by the second probe style information/data 404.

In various embodiments, the style transfer model 102 comprises a generative model and a discriminator model that contest each other in a zero-sum game framework or a strictly competitive game framework. First, the discriminator model is trained to predetermined level of accuracy to, when give two or more options and one of the options is of the second probe style, determine which of the two or more options is the option of the second probe style. Next, the generator model and the discriminator model are jointly trained by first providing the generator model with an instance of first probe information/data and having the generator model generate an instance of attempted training information/data and secondly having the discriminator determine if the instance of attempted training information/data is of the second probe style. For example, the generator model may map an instance of first probe information/data from a domain described and/or characterized by the first probe style to a domain described and/or characterized by the second probe style. In another example, the discriminator model may be provided and/or presented with an instance of second probe information/data and the instance of training information/data and may be asked to determine which is the instance of second probe information/data. The feedback provided by the discriminator models choice is used to update the model parameters of both the generative model and the discriminator model. For example, the discriminator models choice may be used via backpropagation to improve the accuracy of both the generator model and the discriminator model. In the zero-sum game and/or strictly competitive game framework, the generator model "wins" when the discriminator model selects the instance of attempted training data as being the instance of second probe information/data. Conversely, the discriminator model "wins" when the discriminator model correctly selects the instance of second probe information/data. Thus, the training of the generator model and the discriminator model leads to the generator model generating instances of attempted training information/data that better approximates and/or mimics the second probe style and the discriminator model being able to more reliably determine when an instance of information/data is in accordance with the second probe style. In various embodiments, the style transfer model may be trained until the discriminator model selects the instance of attempted training information/data over the actual instance of second probe information/data at a predetermined rate (e.g., approximately 50% of the time, 48% of the time, and/or the like). For example, in an example embodiment, the generative model may be run independently to generate training information/data of the second probe style and/or that approximates and/or substantially mimics the second probe style after the training of the style transfer model. In an example embodiment, the style transfer model may undergo an initial training phase until the discriminator model selects the instance of attempted training information/data over the actual instance of second probe information/data at a predetermined rate (e.g., approximately 50% of the time, 48% of the time, and/or the like) and then may continue to be trained (e.g., the model parameters of the generative model and/or the discriminator model may continue to be updated based on whether the discriminator model correctly selects the actual instance of second probe information/data) for at least a portion of the time while the training information/data is being generated. For example, once the initial training phase is complete, the style transfer model may be used to generate instances of training information/data.

In various embodiments, each of the generative model and the discriminator model is a neural network, deep net, and/or other model. For example, each of the generative model and the discriminator model comprises one or more input nodes and one or more output nodes. In an example embodiment, the input nodes of the generative model correspond to input of one or more instances of first probe information/data and feedback regarding recent selections made by the discriminator model. In an example embodiment, the feedback regarding the recent selections may by the discriminator model may only be provided during the training phase whereas, in another example embodiment, the feedback regarding the recent selections of the discriminator model may continue to be provided after an initial training phase (wherein the initial training phase is a training phase where the generator is trained to a predetermined level of accuracy). In an example embodiment, the input nodes of the discriminator model correspond to the output node of the generator model and/or one or more instances of (attempted) training information/data and one or more instances of second probe information/data and/or second probe style information/data 404. In an example embodiment, the output nodes of the discriminator model may correspond to an input node of the generator model and/or a node configured to provide an indication of whether the discriminator model correctly identified the instance of second probe information/data or not. As should be understood, each of the generator model and the discriminator model comprise a plurality of hidden nodes in addition to the input and output nodes thereof. Each hidden node is connected to one or more input nodes and includes computational instructions, implemented in machine codes, computer-executable code, and/or the like by the processor 12, for computing the Output provided via the output nodes, respectively. Each input node includes a memory location for storing an input value and each output node includes a memory location for storing a corresponding output Continuing to block 308 of FIG. 3, training information/data is generated. The training information/data is of the second probe style and/or a style that approximates and/or substantially mimics the second probe style. For example, the network apparatus 10 may use the style transfer model to generate training information/data based on at least a portion of the first probe information/data. For example, the network apparatus 10 may comprise means, such as the processor 12, memory 14, communication interface 18 and/or the like, for generating the training information/data. For example, at least a portion of the first probe information/data (e.g., a plurality of instances of first probe information/data) may be provided to the style transfer model 102. The style transfer model 102 may then generate a plurality of instances of training information/data based on the plurality of instances of first probe information/data. In an example embodiment, one or more instances of training information/data may correspond to the same instance of first probe information/data. For example, the color of a feature within an image of the instance of first probe information/data may be changed to generate multiple different instances of training information/data, the make/model of a vehicle shown in an image of the instance of first probe information/data may be changed to generate multiple different instances of training information/data, and/or the like.

In various embodiments, an instance of training information/data comprises sensor data of the second probe style and/or that approximates and/or substantially mimics the second probe style. In an example embodiment, an instance of training information/data comprises one or more annotations, labels, and/or the like that identifies, labels, and/or provides information/data regarding one or more features within the sensor information/data. In an example embodiment, the one or more annotations, labels, and/or the like may be generated by transforming any annotations, labels, and/or the like present in the corresponding instance of first probe information/data. For example, the instance of training information/data 406 may correspond to the instance of first probe information/data 402 and the annotations, labels, and/or the like of the instance of training information/data 406 may be a transformed version of the annotations, labels, and/or the like of the instance of first probe information/data 402. For example, the style transfer model may map the sensor information/data of the instance of first probe information/data 402 from the first probe style to the second probe style (and/or a domain that approximates and/or substantially mimics the second probe style) and may also map the annotations, labels, and/or the like of the instance of first probe information/data 402 from the first probe style to the second probe style (and/or the domain that approximates and/or substantially mimics the second probe style) to generate the instance of training information/data 406. In an example embodiment, the first probe information/data used to train the style transfer model may be the same set of information/data or a different set of information/data.

At block 310, the second probe style model 104 is trained. For example, the network apparatus 10 may train the second probe style model 104. For example, the network apparatus 10 may comprise means, such as the processor 12, memory 14, communications interface 18, and/or the like, for training the second probe style model 104. In an example embodiment, the second probe style model 104 operates and/or runs at least in part on the network apparatus 10 and/or another computing entity in communication with the network apparatus 10. In an example embodiment, the second probe style model 104 is a neural network, deep net, model and/or the like. For example, in various embodiments, the second probe style model 104 is a classifier model, feature detector/extractor, and/or the like. For example, the second probe style model 104 may be provided with training information/data that is of the second probe style and/or that approximates and/or substantially mimics the second probe style and trained to identify and/or extract various features within the instances of training information/data and/or classify the instances of training information/data and/or one or more features identified therein.

In an example embodiment, each instance of training information/data is provided and/or displayed to a human quality control personnel (e.g., via a display device of a computing entity that is in communication with the network apparatus 10 and/or that is a client of the network apparatus 10). The human quality control personnel may then provide input (e.g., via an input device such as a touch screen, keyboard, mouse, and/or the like of a computing entity that is in communication with the network apparatus 10 and/or that is a client of the network apparatus 10) indicating whether a particular instance of training information/data sufficiently approximates and/or mimics the second probe style and should be included in the training information/data used to train the second probe style model 104. For example, if the human quality control personnel determines that an instance of training information/data does not approximate and/or substantially mimic the second probe style, the human quality control personnel may provide user input indicating that the instance of training information/data should not be included in the training information/data. In such an embodiment, the training information/data used to train the second probe style model 104 consists of instances of training information/data that have been deemed, by a human quality control personnel, to approximate the second probe style and/or substantially mimic the second probe style.

In an example embodiment, the second probe style model comprises one or more input nodes. For example, an input node may be configured to receive an instance of training information/data (and/or second probe information/data after the training phase). In an example embodiment, the second probe style model comprises one or more output nodes. For example, the one or more output nodes may be configured to provide a classification, feature information/data, and/or the like extracted and/or identified from the training information/data (and/or second probe information/data after the training phase). The second probe style model further comprises a plurality of hidden nodes in addition to the input and output nodes. Each hidden node is connected to one or more input nodes and includes computational instructions, implemented in machine codes, computer-executable code, and/or the like by the processor 12, for computing the output provided via the output nodes, respectively. Each input node includes a memory location for storing an input value/instance of training information/data and/or second probe information/data and each output node includes a memory location for storing a corresponding output signal.

At block 312, at some point after the second probe style model is trained, one or more instances of second probe information/data are received. For example, a second probe apparatus 20 may cause one or more second probe sensors 49 to capture sensor information/data. The second probe apparatus 20 may then provide (e.g., via communication interface 48) the sensor information/data as part of second probe information/data. The network apparatus 10 may receive the second probe information/data. For example, the network apparatus 10 may comprise means, such as the processor 12, memory 14, communication interface 18, and/or the like, for receiving the second probe information/data. In various embodiments, the second probe information/data comprises sensor information/data of the second probe style.

At block 314, map information/data 408 is generated and/or extracted from the second probe information/data using the second probe style model 104. For example, the network apparatus 10 may use the second probe style model 104 to generate and/or extract map information/data 408 from the second probe information/data. For example, the network apparatus 10 may comprise means, such as the processor 12, memory 14, communication interface 18, and/or the like, for generating and/or extracting map information/data 408 from the second probe information/data. For example, the network apparatus 10 may provide the second probe information/data to one or more input nodes of the second probe style model and receive map information/data via one or more output nodes of the second probe style model. For example, the second probe style model may analyze the second probe information/data to identify one or more features present in the second probe information/data, extract feature information/data for one or more features present in the second probe information/data, classify the second probe information/data and/or one or more features present therein, and/or the like. In an example embodiment, the map information/data comprises location information/data (e.g., a geolocation; latitude and longitude; latitude, longitude, and elevation/altitude; a location relative to one or more other features, and/or the like) for one or more features identified in the second probe information/data, a classification of one or more features identified in the second probe information/data, an image or description of one or more features identified in the second probe information/data, and/or the like.

At block 316, the map information/data 408 is used to update a digital map 106 and/or one or more tiles of a digital map 106. For example, the digital map 106 may be updated based on the map information/data to generate and/or expand the digital map 106 and/or to update the digital map 106. For example, the network apparatus 10 may update the digital map 106 and/or one or more tiles of a digital map 106 based on the map information/data 408. For example, the network apparatus 10 may comprise means, such as the processor 12, memory 14, and/or the like for updating the digital map 106 and/or one or more map tiles of the digital map 106. For example, the digital map 106 may be updated to include one or more features identified in the second probe information/data, feature information/data extracted from the second probe information/data, one or more road segments, links, lanes, and/or the like corresponding to the second probe information/data, and/or the like. For example, a localization layer may be updated based on feature information/data of the map information/data generated and/or extracted from the second probe information/data. In another example, one or more link records, node record, point of interest (POI) records, and/or the like may be updated based on the map information/data generated and/or extracted from the second probe information/data.

The updated digital map 106 and/or one or more updated digital map tiles of the updated digital map 106 may then be may then be packaged in to updated map tiles for provision to one or more vehicle apparatuses 30. For example, the network apparatus 10 may comprise means, such as processor 12, memory 14, and/or the like, for packaging the updated digital map 106 into updated map tiles.

At block 318, one or more updated map tiles may be provided. For example, the network apparatus 10 may provide one or more updated map tiles. For example, the network apparatus 10 may comprise means, such as the processor 12, memory 14, communications interface 16, and/or the like for providing the one or more updated map tiles. For example, an updated map tile may be provided (e.g., transmitted) and then received by a vehicle apparatus 30. The vehicle apparatus 30 may receive (e.g., via a communication interface thereof) the updated map tile comprising and/or updated based on at least a portion of the map information/data generated and/or extracted from the second probe information/data by the second probe style model. The vehicle apparatus 30 may then perform (e.g., via a processor and/or memory thereof) one or more navigation functions using the updated map tile. In various embodiments, navigation functions may be localization functions (e.g., determining the location of the vehicle apparatus 30 and/or another entity within a map), route planning functions (e.g., determining a route from an origin to a destination), route guidance functions (e.g., assisting an autonomous vehicle and/or human operator navigate a route from an origin to a destination), controlling ADAS (e.g., with functions such as lane keeping, lane changing assistance, automated overtake maneuvers, merging maneurvers, or autonomous driving, and/or other functions) and/or the like.

Advantages

Various embodiments of the present invention provide methods, apparatuses, systems, computer program products, and/or the like for generating synthetic training information/data of a first probe style based on virtually captured first sensor information/data and/or existing (e.g., previously captured and/or labeled) first sensor information/data of a first probe style by a network apparatus 10. The training information/data of the second probe style may then be used by a network apparatus 10 for training a second probe style model that, once trained, may be used to analyze second probe information/data of the second probe style to generate map information/data. A digital map may be updated by the network apparatus 10 based on the map information/data and one or more vehicle apparatus 30 may perform one or more navigation functions based on the digital map and/or one or more tiles thereof.

Training a second probe style model requires a significant amount of training information/data. In particular, a large number of instances of training information/data that include labels are required for the training of the second probe style model to converge to an optimal and/or acceptable level of performance. The capturing of the second probe style information/data to be used as transition data requires a fleet of vehicles each having a second probe apparatus 40 and second probe sensors 49 on board to capture an appropriate number of instances of second probe information/data. The large number of instances of second probe information/data must then be labeled by hand to generate the training information/data. Thus, traditional methods of generating training information/data are time and resource intensive. In contrast, the synthetic training data of the present invention may be generated based on virtual first probe information/data and/or existing first probe information/data that has already been labeled. This virtual first probe information/data and/or existing first probe information/data may then be transformed and/or used as a basis for generating training information/data of the second probe style. The training information/data comprises sensor information/data of the second probe style and corresponding annotations, labels, and/or the like.

Thus, example embodiments provide technical improvements to a technical problem by reducing the resources needed to generate training information/data for training a second probe style model. In particular, the use of the style transfer model for generating training information/data for training a second probe style model provides for the efficient generation of map information/data from a variety of different second probe apparatuses 40. For example, for each type of second probe apparatus 40 and/or each configuration of second probe sensors 49, a different second probe style model is needed for the generation and/or extraction of map information/data from the information/data captured thereby. By being able to synthetically generate training data for a variety of types of second probe apparatuses 40 and/or configurations of second probe sensors 49 (e.g., by transforming existing first probe information/data and/or based on virtual first probe information/data), multiple types of second probe style models may be easily trained. Thus, the second probe apparatuses 40 and the corresponding instances of second probe information/data generated and provided thereby may be used to more efficiently update the digital map. As more sophisticated ADAS and autonomous vehicles access road networks, the need for an up to date, highly accurate digital map greatly increases. Various embodiments of the present invention provide for overcoming the technical challenge of being able to provide accurate and timely updates to a digital map. The digital map may then be used by the vehicle apparatus 30 to perform various navigation functions. Thus, various embodiments provide an improvement to navigation technology by providing for efficient and accurate updating of a digital map for use by a vehicle apparatus (e.g., navigation apparatus, ADAS, autonomous vehicle, and/or the like) in performing navigation functions.

III. Example Apparatus

The first probe apparatus 20, vehicle apparatus 30, second probe apparatus 40, and/or network apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the vehicle apparatus 30, first probe apparatus 20, second probe apparatus 40, and/or network apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a first probe apparatus 20, vehicle apparatus 30, and/or second probe apparatus 40 is an in-vehicle navigation system onboard a vehicle 5 or a mobile device and a network apparatus 10 is a server. In an example embodiment, a first probe apparatus 20 and/or a second probe apparatus 40 is an apparatus dedicated to the capturing of sensor information/data. In this regard, FIG. 2A depicts an example network apparatus 10, FIG. 2B depicts an example first probe apparatus 20, and FIG. 2C depicts an example second probe apparatus 40 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a first probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, a second probe apparatus 40 may include, may be associated with, or may otherwise be in communication with a processor 42 and a memory device 44 and optionally a communication interface 46, a user interface 48, one or more sensors 49 (e.g., a location sensor such as a GNSS sensor, IMU sensors, and/or the like; camera(s); 2D and/or 3D LiDAR(s); long, medium, and/or short range RADAR;

ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, a vehicle apparatus 30 may similarly comprise include, may be associated with, or may otherwise be in communication with a processor and a memory device and optionally a communication interface, a user interface, one or more sensors (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein.

In some embodiments, the processor 12, 22, 42 (and/or co-processors or any other processing circuitry assisting or otherwise associated with the processor) may be in communication with the memory device 14, 24, 44 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, first probe apparatus 20, vehicle apparatus 30, and/or second probe apparatus 40 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 42 may be embodied in a number of different ways. For example, the processor 12, 22, 42 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 42 may include one or more processing cores configured to perform independently. A multi-core processor may enable multiprocessing within a single physical package. Additionally or alternatively, the processor 12, 22, 42 may include one or more processors configured in tandem via the bus to enable independent execution of instructions, pipelining and/or multithreading.

In an example embodiment, the processor 12, 22, 42 may be configured to execute instructions stored in the memory device 14, 24, 44 or otherwise accessible to the processor. For example, the processor 22, 42 may be configured to execute computer-executable instructions embedded within a link record of a map tile and/or provided as part of a travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, first probe apparatus 20, vehicle apparatus 30, and/or second probe apparatus 40 may include a user interface 18, 28, 48 that may, in turn, be in communication with the processor 12, 22, 42 to provide output to the user, such as one or more instances of training information/data and/or graphical presentations thereof, one or more routes through a road network, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 42 (e.g., memory device 14, 24, 44 and/or the like).

The network apparatus 10, first probe apparatus 20, vehicle apparatus 30, and/or second probe apparatus 40 may optionally include a communication interface 16, 26, 46. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, first probe apparatus 20, vehicle apparatus 30, and/or second probe apparatus 40 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, road segments, nodes, intersection, and/or the like and/or the corresponding data records, a localization layer (e.g., comprising localization features) and/or the corresponding data records, and/or the like.

In an example embodiment, the road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from second probe information/data provided by second probe apparatuses 40 through the use of a second probe style model. In various embodiments, the second probe apparatuses 40 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, first probe apparatus 20, vehicle apparatus 30, and/or second probe apparatus 40 in accordance with an example embodiment may determine the time to traverse a route that includes one or more turns at respective intersections more accurately.

IV. Apparatus, Methods, and Computer Program Products

As described above, FIG. 3 illustrates a flowchart of a network apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 44 of an apparatus employing an embodiment of the present invention and executed by the processor 12, 22, 42 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
defining, via a network apparatus, first probe data, an instance of first probe data comprising one or more labels and sensor data of a first probe style;
generating, via a style transfer model operating at least in part on the network apparatus, training data based on at least a portion of the first probe data, wherein an instance of training data corresponds to an instance of first probe data and sensor data in a second probe style, the second probe style being different from the first probe style;
training, via the network apparatus, a second probe style model using machine learning and at least a portion of the training data, wherein (a) the second probe style model is used to analyze one or more instances of second probe data of the second probe style to extract map information from the second probe data and (b) each instance of second probe data is captured by one or more second probe sensors of a second probe apparatus;
receiving, by the network apparatus, at least one instance of second probe data comprising sensor data (a) captured by one or more second probe sensors and (b) of a second probe style; and
extracting map information from the at least one instance of second probe data by analyzing the at least one instance of second probe data using the second probe style model.

2. The method of claim 1, wherein the second probe style corresponds to characteristics of the one or more second probe sensors.

3. The method of claim 1, wherein the style transfer model is a generative adversarial network.

4. The method of claim 1, wherein the instance of first probe data is an annotated instance of data of the first probe style and is captured by one or more first probe sensors of a first probe apparatus.

5. The method of claim 1, further comprising generating the instance of first probe data by capturing synthetic sensor data with a virtual sensor within a virtual environment.

6. The method of claim 5, further comprising automatically generating one or more labels for the instance of first probe data based on the virtual environment.

7. The method of claim 1, wherein (a) two or more instances of training data correspond to the same instance of first probe data and (b) the two or more instances of training data are different in at least one feature.

8. The method of claim 1, wherein (a) an instance of training data is an image, (b) the one or more second probe sensors comprise an imaging device configured to capture an image of the second probe style, and (c) the second probe style model is a feature detection model used to generate map information for a digital map.

9. The method of claim 1, further comprising:
updating, by the network apparatus, a digital map based on the map information; and
providing, by the network apparatus, one or more tiles of the digital map to one or more vehicle apparatuses, wherein at least one of the one or more vehicle apparatuses performs at least one navigation function using the one or more tiles of the digital map.

10. An apparatus comprising at least one processor, a communications interface configured for communicating via at least one network, and at least one memory storing computer program code, the at least one memory and the computer program code configured to, with the processor, cause the apparatus to at least:
define first probe data, an instance of first probe data comprising one or more labels and sensor data of a first probe style;
generate, via a style transfer model operating at least in part on the network apparatus, training data based on at least a portion of the first probe data, wherein an instance of training data corresponds to an instance of first probe data and sensor data in a second probe style, the second probe style being different from the first probe style;
train a second probe style model using machine learning and at least a portion of the training data, wherein (a) the second probe style model is used to analyze one or more instances of second probe data of the second probe style to extract map information from the second probe data and (b) each instance of second probe data is captured by one or more second probe sensors of a second probe apparatus;
receive at least one instance of second probe data comprising sensor data (a) captured by one or more second probe sensors and (b) of a second probe style; and
extract map information from the at least one instance of second probe data by analyzing the at least one instance of second probe data using the second probe style model.

11. The apparatus of claim 10, wherein the second probe style corresponds to characteristics of the one or more second probe sensors.

12. The apparatus of claim 10, wherein the style transfer model is a generative adversarial network.

13. The apparatus of claim 10, wherein the instance of first probe data is an annotated instance of data of the first probe style and is captured by one or more first probe sensors of a first probe apparatus.

14. The apparatus of claim 10, wherein the at least one memory and the computer program code are further configured to, with the processor, cause the apparatus to at least generate the instance of first probe data by capturing synthetic sensor data with a virtual sensor within a virtual environment.

15. The apparatus of claim 14, wherein the at least one memory and the computer program code are further configured to, with the processor, cause the apparatus to at least automatically generate one or more labels for the instance of first probe data based on the virtual environment.

16. The apparatus of claim 14, wherein (a) two or more instances of training data correspond to the same instance of first probe data and (b) the two or more instances of training data are different in at least one feature.

17. The apparatus of claim 14, wherein (a) an instance of training data is an image, (b) the one or more second probe sensors comprise an imaging device configured to capture an image of the second probe style, and (c) the second probe style model is a feature detection model used to generate map information for a digital map.

18. The apparatus of claim 14, wherein the at least one memory and the computer program code are further configured to, with the processor, cause the apparatus to at least:
update a digital map based on the map information; and
provide one or more tiles of the digital map to one or more vehicle apparatuses, wherein at least one of the one or more vehicle apparatuses performs at least one navigation function using the one or more tiles of the digital map.

19. A computer program product comprising at least one non-transitory computer-readable storage medium having computer-readable program code portions stored therein, the computer-readable program code portions comprising executable portions configured, when executed by a processor of a network apparatus, to cause the network apparatus to:
define first probe data, an instance of first probe data comprising one or more labels and sensor data of a first probe style;
generate, via a style transfer model operating at least in part on the network apparatus, training data based on at least a portion of the first probe data, wherein an instance of training data corresponds to an instance of first probe data and sensor data in a second probe style, the second probe style being different from the first probe style;
train a second probe style model using machine learning and at least a portion of the training data, wherein (a) the second probe style model is used to analyze one or more instances of second probe data of the second probe style to extract map information from the second probe data and (b) each instance of second probe data is captured by one or more second probe sensors of a second probe apparatus;
receive at least one instance of second probe data comprising sensor data (a) captured by one or more second probe sensors and (b) of a second probe style; and
extract map information from the at least one instance of second probe data by analyzing the at least one instance of second probe data using the second probe style model.

20. The computer program product of claim 19, wherein the second probe style corresponds to characteristics of the one or more second probe sensors.

* * * * *